(12) United States Patent
Müller et al.

(10) Patent No.: US 9,587,393 B2
(45) Date of Patent: Mar. 7, 2017

(54) METHOD FOR PRODUCING SANDWICH CONSTRUCTION ELEMENTS

(76) Inventors: Franz Josef Müller, Iserlohn (DE); Peter Werner, Travemünde (DE); Peter Stracke, Iserlohn (DE)

( * ) Notice: Subject to any disclaimer, the term of this patent is extended or adjusted under 35 U.S.C. 154(b) by 1016 days.

(21) Appl. No.: 13/805,081

(22) PCT Filed: Jun. 24, 2011

(86) PCT No.: PCT/EP2011/003105
§ 371 (c)(1),
(2), (4) Date: Apr. 15, 2013

(87) PCT Pub. No.: WO2011/160842
PCT Pub. Date: Dec. 29, 2011

(65) Prior Publication Data
US 2013/0209723 A1    Aug. 15, 2013

(30) Foreign Application Priority Data

Jun. 25, 2010   (DE) .................. 10 2010 025 169

(51) Int. Cl.
| | |
|---|---|
| *B32B 5/18* | (2006.01) |
| *B32B 5/20* | (2006.01) |
| *B32B 38/06* | (2006.01) |
| *B29C 44/06* | (2006.01) |
| *C08J 5/24* | (2006.01) |
| *E04B 1/14* | (2006.01) |
| *B29C 44/12* | (2006.01) |
| *B29C 44/32* | (2006.01) |
| *B29C 70/68* | (2006.01) |
| *B32B 5/22* | (2006.01) |
| *B32B 5/24* | (2006.01) |
| *C08J 5/04* | (2006.01) |
| *C08J 9/00* | (2006.01) |
| *E04C 2/22* | (2006.01) |
| *E04C 2/24* | (2006.01) |
| *B32B 38/00* | (2006.01) |
| *B29K 311/10* | (2006.01) |
| *B32B 37/12* | (2006.01) |

(52) U.S. Cl.
CPC ................ *E04B 1/14* (2013.01); *B29C 44/06* (2013.01); *B29C 44/1214* (2013.01); *B29C 44/1228* (2013.01); *B29C 44/326* (2013.01); *B29C 70/68* (2013.01); *B32B 5/18* (2013.01); *B32B 5/20* (2013.01); *B32B 5/22* (2013.01); *B32B 5/245* (2013.01); *B32B 38/06* (2013.01); *C08J 5/045* (2013.01); *C08J 5/24* (2013.01); *C08J 9/0085* (2013.01); *E04C 2/22* (2013.01); *E04C 2/243* (2013.01); *B29K 2311/10* (2013.01); *B32B 37/1207* (2013.01); *B32B 2037/1269* (2013.01); *B32B 2038/0084* (2013.01); *B32B 2250/40* (2013.01); *B32B 2260/021* (2013.01); *B32B 2260/023* (2013.01); *B32B 2260/046* (2013.01); *B32B 2262/062* (2013.01); *B32B 2262/065* (2013.01); *B32B 2262/08* (2013.01); *B32B 2262/14* (2013.01); *B32B 2266/0285* (2013.01); *B32B 2305/022* (2013.01); *B32B 2305/07* (2013.01); *B32B 2305/34* (2013.01); *B32B 2307/546* (2013.01); *B32B 2307/718* (2013.01); *B32B 2309/02* (2013.01); *B32B 2309/04* (2013.01); *B32B 2309/10* (2013.01); *B32B 2419/00* (2013.01); *B32B 2607/00* (2013.01); *C08J 2361/06* (2013.01); *Y10T 428/23914* (2015.04)

(58) Field of Classification Search
CPC .. B32B 5/18; B32B 5/20; B32B 5/245; B32B 37/1207; B32B 2037/1253; B32B 2038/0084; B32B 38/06; B32B 2250/40; B32B 2262/062; B32B 2262/065; B32B 2262/08; B32B 2266/0285; B32B 2305/022; B32B 2305/07; B32B 2305/28; B32B 2317/16; B32B 2607/00; B32B 2260/021; B32B 2260/023; B32B 2260/046; B29C 44/06; B29C 44/1214; B29C 44/1228; B29C 44/326; B27N 3/005; E04C 2/243; E04C 2/246; C08J 5/045; C08J 5/24; C08J 9/0085; C08J 2361/06
See application file for complete search history.

(56) References Cited

U.S. PATENT DOCUMENTS 2,376,653 A * 5/1945 Boyer ..................... B32B 27/00
105/355
3,915,772 A * 10/1975 Weissenfels ............. C08J 9/141
156/155

(Continued)

FOREIGN PATENT DOCUMENTS

| GB | 1052431 A | 12/1966 |
| GB | 1278378 A | 6/1972 |

(Continued)

*Primary Examiner* — Michael Tolin

(57) ABSTRACT

The invention relates to a method for producing sandwich construction elements for substantially load-bearing and self-supporting building parts. In one embodiment of the invention, a method is provided including a) producing at least one layer of a mechanically bonded fiber nonwoven which is impregnated with a binder based on at least one heat-curable resin system b) curing the heat-curable resin system in order to produce at least one hardened layer of the fiber nonwoven, and fixed thermally, c) bringing a heat-foamable or heat-foamed phenol resin into contact with that surface of at least one hardened layer of the fiber nonwoven which has been modified according to step b), d) possibly annealing the composite produced in a) to c), and e) curing the further binder based on at least one heat-curable resin system.

12 Claims, No Drawings

(56) References Cited

U.S. PATENT DOCUMENTS 6,030,559 A * 2/2000 Barry ................. B29C 44/1209
                                                            264/257
2005/0221011 A1* 10/2005 Eichner ................... D06N 7/00
                                                            427/372.2

FOREIGN PATENT DOCUMENTS

| JP | 06-033531 A | * | 2/1994 |
| WO | WO 99/21712 A1 | * | 5/1999 |
| WO | WO 2007/029222 A1 | * | 3/2007 |
| WO | WO 2009/047483 A1 | * | 4/2009 |

* cited by examiner

METHOD FOR PRODUCING SANDWICH CONSTRUCTION ELEMENTS

This application claims the benefit of PCT Application PCT/EP2011/003105 with International Filing Date of Jun. 24, 2011, published as WO 2011/160842 A2, which further claims priority to German Patent Application No. 102010025169.0 filed Jun. 25, 2010, the entire contents of both are hereby incorporated by reference.

The invention relates to a method for producing sandwich construction elements for essentially loadbearing and self-supporting parts of a building.

A sandwich construction element is generally understood to be a structure comprising two or more interconnected layers of materials with respectively different properties, constructed from two outer layers and a core there between. A structural design of this type affords improved loadbearing capacity compared with the starting materials while saving material and weight. It is especially for applications in the field of architecture and building construction that the use of sandwich construction elements is becoming more and more important, not only for cladding but also for essentially loadbearing and self-supporting elements. Self-supporting structural components, in addition to their own weight, bear some of the imposed load. The imposed load (also known as live load) in building construction is understood as meaning a variable or moving force acting on a structural component due to people, installed fittings, stored materials, machines or vehicles for example. DIN 1055-3:2006-03 stipulates the perpendicular imposed load a structural component must be able to resist. A loadbearing structural component, in contrast to a self-supporting one, is capable of safely transmitting all loads, i.e., it also assumes the dead and live loads from other adjoining structural components and passes them on. Walls, ceilings, beams, props and the foundations are generally loadbearing structural components. A loadbearing wall, for instance, has to be able to absorb dead loads and imposed live loads of superior structural components (e.g., ceiling, roof, superior wall structure).

The advantage of using sandwich construction elements in the building industry has hitherto been that requirements with respect to thermal insulation and protection from environmental effects can be met at the same time as construction-based requirements. The choice of material for the outer layers makes it possible to meet design and aesthetically architectural requirements to a very high degree via the construction elements themselves. A further advantage consists in the durability of sandwich construction elements demonstrated by the more than 30 years of practical use in building construction. It is also essential that building construction can be appreciably hastened by using prefabricated sandwich construction elements, which lead to cost savings which are appreciable.

The core element used is generally lightweight, usually a foam. The outer layers consist, typically, of metal or fiber-reinforced plastics. Not only the outer layers but also the core layer have to be able to absorb various forces and also withstand stresses, and therefore they have to be suitably harmonized with each other. Outer layers have the primary office of absorbing and transmitting tensile and compressive forces as well as ensuring mechanical protection for the core material.

The office of the core is mainly to keep the two outer layers spaced apart and in the process absorb corresponding forces; to ensure shear transmission between the outer layers; and also to stabilize the outer layers against dents. The core material further has a thermally insulating effect through use of synthetic foams in particular. However, one issue with the use of materials for foams is that they fail to meet the evermore stringent fire protection requirements (incombustibility, low smoke density, low smoke toxicity). This is why there is an increasing trend toward using phenolic resin foams (e.g., DE 20 2006 004 153 U1) for core layers, since their three-dimensionally highly crosslinked molecular structure is able to meet the high fire protection requirements for uses in architecture and building construction. Sandwich construction elements with phenolic resin foam systems further have significantly better insulating properties (lambda=0.022 W/mK) over commercially typical panels with polyurethane or Styropore foams and so especially outstanding thermal insulation performance under extreme conditions, lower shrinkage and dimensional stability in heat and also improved strength properties at high temperatures.

However, existing processes for fabricating sandwich construction elements having a phenolic resin foam core fail to fabricate elements having self-supporting or essentially loadbearing functionality because the high brittleness of phenolic resin foam causes low adherence between the outer layers and the foam and thus prevents the necessary transmission of pressure and of tensile and shear forces. Furthermore, the only equipment hitherto available for industrial fabrication of sandwich construction elements have been designed for the manufacture of sandwich panels having mineral wool cores. Prefabricated outer layers are unwound off spools and then adhesively bonded to the core in a continuous manner. Outer layers accordingly must have a constitution which allows them to be wound up on spools; that is, they have to have a level of elasticity which is disadvantageous for the later use for self-supporting and loadbearing construction elements. The choice of outer layers and core materials is technically limited as a result. Therefore, phenolic resin foam cores have hitherto merely been used for production of cladding or of structural components augmented with profiles and/or other loadbearing elements.

U.S. Pat. No. 3,764,428 discloses formed products for construction materials for walls, ceilings and doors, which consist of an unbonded fleece of natural fibers and a foamable heat-curable resin. The foam can penetrate into the unbonded fleece, causing the entire composite to expand. However, it transpires that a composite thus obtained does not adequately meet the strength requirements currently expected of loadbearing and self-supporting structural components.

The problem addressed by the present invention here is that of fabricating a sandwich element which is suitable for self-supporting and essentially loadbearing parts of a building because it ensures the requisite transmission of compressive, tensile and shear forces between outer and core layers and meets the tightened fire protection requirements.

This problem is solved according to the present invention by a method comprising the steps of a) producing one or more than one ply of a mechanically consolidated fibrous fleece based on naturally occurring raw materials, especially hemp, flax, jute, sisal or kenaf, cotton and wool and/or mixtures thereof and impregnated with a binder based on one or more than one heat-curable resin system, b) curing the heat-curable resin system to produce one or more than one cured ply of the fibrous fleece, wherein a surface structure is applied to at least part of the ply of the fibrous fleece before and/or during curing, and/or one or more than one further binder based on one or more than one heat-curable resin system is applied to at least part of the surface of the cured ply of the fibrous fleece and thermally fixed, c) contacting a thermally foamable or foamed phenolic resin with the surface, as modified in step b), of one or more than one cured ply of the fibrous fleece, d) optionally subjecting the composite produced under a) to c) to conditioning at temperatures in a range from 40 to 80° C., and e) subjecting the further binder based on one or more than one heat-curable resin system and optionally applied in b) to curing in a range from 150 to 200° C., optionally under elevated pressure.

This surprisingly provides a sandwich construction element that is capable of meeting the mechanical requirements of self-supporting and essentially loadbearing parts of a building. At the same time, fire protection performance is outstanding.

It was found that the foam fully cures in the temperature range from 40 to 80° C., preferably at 50 to 60° C., since any cooling below 40° C. during the process of curing causes stresses in the foam and attendant cracking. This cracking, even in the microscopic range, leads to inutility for the foam as core material to transmit the static and dynamic forces encountered as constituent part of a sandwich construction element with self-supporting and loadbearing functionality.

The fibrous fleece used for the method of the present invention is based on naturally occurring raw materials, especially renewable raw materials. This ensures that the raw material is provided in a sustainable and ecological manner. Hemp, flax, jute, sisal, kenaf, cotton and wool and/or mixtures are preferred in particular. The in-principle advantages of natural fibers for uses in the building construction sector over synthetic fibers (glass fibers, manufactured fibers, etc) and also over mineral natural fibers (basalt) reside especially in the far superior ecobalance, since natural fibers are unconcerning with regard to health, need far less primary energy to produce, have a neutral $CO_2$ balance and are bio- and thermodegradable and hence easy to dispose of or, respectively, use for energy recovery. A significant advantage over glass fibers in particular relates to health and workplace protection for mechanical processing (e.g., sawing, milling, drilling, etc) of laminates, since no health-endangering fiber dust particles (respirable fibers) are produced. Laminates of natural fibers can be treated similarly to the health and safety precautions for wood processing. The glass fiber dust problem with the processing of GRP laminates and the sandwich panels fabricated therefrom leads for building construction applications in particular to increased expense for employee and environmental protection to process the construction elements. With regard to the use as a composite material of construction (sandwich construction element) it is especially the high stiffness and also the ability to elongate at break which is of advantage.

The heat-curable resin system used as binder in step a) may preferably be one or more than one resin system based on phenolic, epoxy, amino and/or polyester resins. The heat-curable resin system may additionally contain elastomers and flexibilizing additives (e.g., natural rubber, nitrile rubber, styrene-butadiene rubber, phenoxy resins, polyvinyl acetal, polyvinyl butyral) in a concentration of 5 to 15 wt, based on all components, preferably 6 to 9 wt %. These constituents ensure that the outer ply withstands changing mechanical loads. The heat-curable resin system may further contain a curative/hardener. Hexamethylenetetramine may be mentioned here, although other curatives/hardeners from the prior art (resols, amino resins, benzoxazines) can also be used according to the polymer component used. The heat-curable resin system generally contains, based on all components, from 20 to 50 parts by weight of polymer component, preferably from 25 to 35 parts by weight, from 1 to 10 parts by weight of curative/hardener, water and optionally further admixtures, for example dispersing auxiliaries and processing auxiliaries.

The advantage with this selection of binders is that the essentially strength and elasticity properties of the resin matrix can be optimized for the necessary structural-component requirements according to the use of the building and the location of the building. Phenolic resin systems are notable for high strength and so are predestined for uses in building construction in order that the requisite stiffness of buildings may be achieved. Phenolic resin systems are further especially useful for buildings in regions having high diurnal temperature fluctuations (desert regions for example), since this resin system has significantly better thermal stability and lower thermal expansion than the other resin systems. Epoxy resin systems are particularly suitable for buildings in regions with heightened earthquake risk or for floating homes, since this resin system versus other resin systems has a significantly better elasticity which endows the parts of the buildings in the event of sudden external dynamic stresses with the necessary elasticity to absorb and transmit these forces. Melamine resin systems are able to effect a positive improvement to the surface quality of the ply in respect of hardness and gloss, and are particularly suitable for building applications where these criteria are required. Polyester resin systems are comparatively inexpensive compared with the other resin systems mentioned and so are suitable for use in the construction of low-cost buildings where the properties mentioned for the other resin systems play a minor part. In general, however, other resin systems known from the prior art and mixtures thereof can also be used.

Since the requirements of the buildings and the construction elements used therefor are very different, the significant advantage of the method is that of selecting and combining the binders in accordance with the required properties to achieve optimization of the resin matrix and hence of the outer layer.

It is also possible in this connection for the binder used to be two or more different heat-curable resin systems and/or binder concentrations and/or binder layers. The essential advantage with this version is that a ply can be given different properties across its cross section in accordance with what is required of the structural component. For instance, a very hard and firm outside layer for the outer ply can be combined with a more elastic inside layer. The advantage with this is that to achieve different outside layers it is not necessary to combine two different outer plies and risk subsequent delamination, but that these different properties can be achieved in the cross section of one outer ply. A further advantage with this method is that the ply's inside surface, which faces the foam, can have a lower binder content to create a more open resin matrix, as a result of which the foam is better able to penetrate the voids in the fiber/matrix structure and thereby achieve an additional positive bond between the foam ply and the structured ply.

Preference is given to using a phenol novolak with hexamethylenetetramine as curative in a solvent-free, aqueous dispersion, for example, in a ratio of 85 to 95 parts by weight of novolak and 5 to 15 parts by weight of hexamethylenetetramine, the preferred ratio being 90:10. The advantage is a high crosslink density, which entails good mechanical strength and thermal stability.

The fibers are mechanically consolidated in a conventional manner by needling or by hydroentangling. The fleece is produced by air laying or carding, for example, and is subsequently endowed with the particular binder(s) based on one or more than one heat-curable resin system in various technical ways. The consolidated fleece preferably has a basis weight of 500 to 3000 g/m². The weight ratio of binder to fiber can vary with the area of use and the stress between 10-50:90-50. The impregnated individual fibrous layers or the impregnated intermediate articles thus obtained are dried or thermally fixed at temperatures between 80 and 110° C.—preferably at 90-100° C.—and subsequently cut to size in a conventional manner, or the impregnated fleeces are laid down as flat product.

In one embodiment of the present invention, a surface structure is applied to at least part of the impregnated fibrous fleece before and/or during curing of the fibrous impregnated with a heat-curable binder. In a particularly preferred embodiment, the surface structure is produced in various geometries by placing a lattice, grid or structured tool on the ply of impregnated fibrous fleece. Such a tool consists primarily of metal. The result is to enlarge the surface area of the ply of impregnated fibrous fleece and create a larger area for contact between the ply and the foam. This larger area of contact is effective in increasing the mechanical adhesion between the phenolic resin foam and the outer layer and hence in improving the shear strength in particular. A further advantage of the method is that an additional positive bond between the foam ply and the structured ply is made possible by having the phenolic resin foam penetrate the sinks in the surface geometry.

In a further advantageous embodiment, the structured tools produce angular, round, oval, honeycomb-shaped and/or dimplelike geometries on the surface of the ply of fibrous fleece, since selecting the surface geometry for the ply makes it possible to improve transmission of encountered forces between the outer ply and the foam core in the sandwich construction element in respect of the necessary structural-component requirements according to the use essentially as wall, ceiling, floor or roof element. Wall elements, for example, benefit from geometries such as stripes or diamonds for example in order that predominantly vertical forces acting on the sandwich construction element may be absorbed and transmitted. Ceiling and floor elements benefit particularly from round and dimplelike geometries in order that the predominantly horizontal forces acting on the sandwich construction element may be absorbed and transmitted. In the case of roof elements, oval or honeycomb-shaped geometries can be advantageous depending on the angle of inclination.

However, it is also possible, as an addition or alternative to applying a surface structure, for one or more than one further binder based on heat-curable resin systems to be applied to at least part of the surface of the cured ply of fibrous fleece, for example by sprinkling, blade coating, spread coating, brushing, rolling or similar methods, and can be thermally fixed. The binder used in step b) preferably comprises heat-curable resin systems based on phenolic, epoxy and/or amino resins and/or polyester resins as self-curing systems or combined with a curative/hardener— preferably phenol novolak+curative (preferably hexamethylenetetramine) with an add-on weight of 10 to 200 g/m²— preferably 100 g/m². The result is that, before the foamable phenolic resin is foamed as per step c), a binder based on a heat-curable resin system and applied to the foam-facing side and thermally fixed is activated and cured in step e) by heating (150° C.-200° C., preferably 150° C. to 170° C.) and optionally elevated pressure after concluding the conditioning. The advantage rests on the binder penetrating in the liquid state—before curing—into the surface structure of the foam, so subsequent curing in step e) results in an additional internal adhesive joint between the outer layers and the foam core. A further advantage with this process step is that different resin systems can be used to adjust the properties of the interfacial layer between the outer layer and the foam core. As mentioned, phenolic resin systems make it possible to achieve the strength for a stipulated stiffness on the part of the sandwich construction element as well as low thermal expansion. By using epoxy resin systems, the sandwich construction element can be brought to required elasticity properties. Melamine resin systems make it possible to increase the hardness of the sandwich construction element, if required. The use of various heat-curable resin systems makes it possible to optimize the properties and the interfacial layer between the outer layer and the foam by selecting and combining the binders in line with the structural-component requirements.

A further advantage with the method of the present invention is that the contacting of a foamable phenolic resin with the cured ply in step c) is effected by foaming up the foamable phenolic resin within the cured ply. Phenolic resin foam is to be understood as referring to compositions consisting of a phenol resol and a blowing agent (preferably pentane, hexane, heptane) and a prior art curative (preferably phosphoric acid). The phenolic resin foam mixture generally consists of 2 to 8 parts by weight of blowing agent and 10 to 30 parts by weight of curative based on 100 parts by weight of phenol resol.

Advantageously, the sandwich construction element can be manufactured in accordance with the required structural-component dimensions in a mold that conforms to the required dimensions. This makes it possible to produce a homogeneous element in the required dimensions. Technically, the production of sandwich construction elements by using foamed sheets has advantage over sheets cut from slabstock foam of exceedingly superior quality due to uniform foam distribution and thus homogeneous foam density, since slabstock foams of the required size of sandwich construction elements are prone to inhomogeneous cooling and curing of the slab, thus making it impossible to achieve consistent quality. A further advantage with the method is that a significantly more reactive resin system can be used for foaming sheets which has higher strength properties and lower brittleness for the intended use compared with a resin system for use in the slabstock foam process. A further advantage with the method is that the foam and the ply produced as per step b) are able to form a bond concurrently with the foaming and conditioning/curing.

However, there is also the general possibility that the contacting of foamed phenolic resin with the cured ply in step c) is effected by adhering the foamed phenolic resin to the cured ply. The foamed phenolic resin therein can be foamed in core layer thickness or be cut from slabstock foam, in which case the sheets foamed in structural-component thickness have the advantage of an exceedingly superior quality due to uniform distribution of foam and hence homogeneous density of foam compared with sheets cut from slabstock foam. As a result, a sandwich core foamed in sheet form can be manufactured in the stipulated structural-component dimensions and then be adhered in that form to the outer plies. Adhering further has the advantage that the plies do not have to be transported to the site of foaming, but can be adhered to the foam cores elsewhere. It is particularly preferable in this context for the plies to be fixed with a heat-curable resin system as binder at the manufacturing site in step b) and be adhered to the foam core by thermal activation at the site of forming the sandwich construction element. This makes it possible for building-component production to be decentralized, which offers the advantage of fabricating the sandwich construction elements near the building site.

In a further advantageous embodiment, a structure is introduced onto the foamed surface before adhering to the outer ply by mechanical milling and/or a structured plate being foamed in which is redetachable after conditioning or curing the foam. It is particularly preferable in turn here for this structure to correspond to the negative of the surface structure introduced into the cured ply of fibrous fleece before curing the heat-curable resin system. This provides better bonding between the outer ply and the foam, since larger areas of contact lead to increased mechanical adhesion between the foam and the outer layer and hence more particularly to improved shear strength. Selecting appropriate geometries for the layers is a way to improve the transmission of forces arising between the outer ply and the foam core in the sandwich construction element in respect of the necessary structural-component requirements depending on use essentially as wall, ceiling, floor or roof element.

In a further preferred embodiment, reinforcing elements are introduced between the cured ply of the fibrous fleece and the foamable or foamed phenolic resin. An example of what is possible here is that these reinforcing elements are adhered to the outer plies as per step b) following step d) by thermal curing of the binder (step e). The material of the reinforcing plies preferably consists of glass, basalt, and/or plastic and/or carbon in the form of fibers, unidirectionals, wovens and/or fleeces and/or from the same composition of material as the outer plies. This provides an additional mechanical bond between the outer plies and the foam core of the sandwich construction element. The compressive, tensile and shear forces which arise within the structural component can thus be better transmitted and deflected, which improves the supporting-framework functions of the sandwich construction element in particular. Improved transmission of horizontal and vertical forces within the structural component also reduces the potential risk of outer layers delaminating from the foam.

A further advantage is the possibility of using the introduction of internal reinforcing elements into the sandwich construction element to subdivide it into regions which are filled with the foam in a positively connected manner. This ensures that later externally caused damage to the sandwich construction element due for example to the impact of hard objects of appreciable size as can happen in the case of severe storms for example is confined to the damaged regions and continues to ensure the overall integrity of the sandwich construction element, since the mechanical stresses cannot propagate. This also distinctly reduces the cost and inconvenience of necessary repairs to the sandwich construction element post-damage, especially to the foam core.

It is further possible for reinforcing elements to be introduced into the foamable or foamed phenolic resin during foam production, whether directly in the course of forming the sandwich construction element (use of foamable phenolic resin) or else in the course of producing externally foamed phenolic resin (in mold or in slab). The preferred possibility is to introduce internal reinforcing elements into the foam core fabricated as per step c). The material of these internal reinforcing elements preferably consists of the same materials as the outer layers cured as per step b) in order that a homogeneous assembly of materials may be made possible. But it is also possible to use reinforcing elements made of soda kraft paper impregnated with phenolic resin, or else made of glass, basalt, and/or plastic and/or carbon in the form of fibers, unidirectionals, wovens and/or fleeces. To effect bonding to the outer layers, the plies endowed with a binder as per step b) must be cured in step e). This provides additional mechanical interconnection of the outer plies by the foam core of the sandwich construction element whereby flexural forces in horizontal structural components in particular are better transmitted, and deflected, from one ply to the other ply. Similarly, in vertical structural components, this additional mechanical bond between the outer plies reduces the denting of the element due to vertically acting loads.

Advantageously, the reinforcing elements introduced into the foam have various geometries, for example in the form of stripes, diamonds, cassettes or stars. This makes it possible to improve transmission of encountered forces between the outer ply and the foam core in the sandwich construction element in respect of the necessary structural-component requirements according to the use essentially as wall, ceiling, floor or roof element. Wall elements, for example, benefit from geometries such as stripes or diamonds for example in order that predominantly vertical forces acting on the sandwich construction element may be absorbed and transmitted. Ceiling and floor elements benefit particularly from geometries in the form of cassettes or stars in order that the predominantly horizontal forces acting on the sandwich construction element may be absorbed and transmitted. Geometries in combination of stripes with cassettes can be advantageous here depending on the angle of inclination. Since the requirements of the buildings and the construction elements used therefor are very different, the significant advantage of the method is that it allows, by selection, number and dimensioning of reinforcing elements, to introduce these in accordance with the performance requirements of the building component. For instance, more and/or stronger elements can be introduced into a wall element in the basement of a building than into a sandwich construction element used for an upper storey.

In a preferred version, the contacting of a thermally foamable phenolic resin with the surface of one or more than one cured ply is accompanied by recesses being introduced in the form of channels and/or installation elements and other shapes for, for example, wall sockets and switches. The advantage is that foaming in recesses for installation elements or directly foaming in installation elements in the course of forming the foamed core as sheet has the effect of these recesses and/or installation elements becoming enclosed in a positively connected manner. This avoids possible later damage to the sandwich construction element especially the foam core by cutting, sawing, milling, drilling and/or further mechanical processes. A further advantage of the method is that the direct foaming in of recesses and/or installation elements makes the process of forming the sandwich construction element more productive, since the aforementioned mechanical machining processes can be dispensed with. It is also advantageous that foaming in the installation elements does away with the need to later glue them into the mechanically excavated cavities.

The method of the present invention optionally comprises in step d) subjecting the composite obtained under a) to c) to conditioning at temperatures in a range from 40 to 80° C., preferably at 50 to 60° C. As mentioned, since any cooling below 40° C. during the process of curing causes stresses in the foam, attendant cracking is prevented in this way. This cracking, even in the microscopic range, leads to inutility for the foam as core material to transmit the static and dynamic forces encountered as constituent part of a sandwich construction element with self-supporting and loadbearing functionality. When already foamed phenolic resin is used, conditioning the composite obtained in steps a) to c) can optionally be dispensed with, in which case it is then preferable to perform this step in the course of the foam being produced externally.

The invention will now be more particularly elucidated using an exemplary embodiment:

Sandwich construction elements for essentially loadbearing and self-supporting parts of a building can be formed by following the process hereinbelow:

a) A hemp-flax card fleece in a basis weight of 500 to 3000 g/m$^2$—preferably 1000-2000 g/m$^2$—is mechanically consolidated by needling or hydroentanglement and impregnated with a curable resin system, preferably an aqueous, solvent-free phenol novolak dispersion+curative, preferably hexamethylenetetramine, in a mixing ratio of 90 parts by weight of phenol novolak and 10 parts by weight of hexamethylenetetramine. Impregnation took place in a continuous process using a standard roll product in a width of 1.60 m on a full-bath impregnator of the fleece producer. Dry resin quantity is 10-50%—preferably 30%—of fleece weight. This impregnated fleece is subsequently dried at 80-100° C.—preferably 90° C. material surface temperature— to the point of nontackiness, in a circulating air dryer to render it storage stable and transportable. Following impregnation and drying, the fleece was cut to a width of 1.25 m, which corresponds to the later width of a building component, and rolled up.

The impregnated fleece was then end-itemed off the roll into pieces 2.50 m in length by manual or mechanical cutting, for example with a cross-cutter or by die cutting. The resulting size of 2.50 m×1.25 m for a sheet corresponds to the later dimensions of a building component.

The material is stored dry and adjusts to a natural moisture content of about 8-12% depending on the fiber or fiber blend used.

b) The fleece sheets adjusted to the abovementioned moisture content are placed in a hydraulic or pneumatic heating press, the tool size of which is at least equal to the sheet size, and are press molded and thermosettingly cured at a temperature of 170-200° C.—preferably 180° C.—and a pressure of 3 to 50 kg/m$^2$ down to about 1-3 mm to form a laminate having a density of 0.5 to 1.5 kg/dm$^3$, preferably 1 kg/dm$^3$. A first pressing stroke of about 30-60 seconds under minimal pressure serves to melt the resin system to fully wet the fibers of the fleece. The water vapor evolving in the process due to the residual moisture content of the fleece should be allowed to escape by a subsequent short venting stroke, since water vapor would impair the curing process by forming a vapor barrier within the laminate. In a second pressing stroke, the density required of the laminate is attained using maximum pressure and the resin system is made to cure. Curing time depends on the resin system used and is 2-5 minutes, preferably 3 minutes at a temperature of 180° C. On conclusion of the pressing operation, the cured laminate is removed from the press and cooled down under ambient temperature.

To press a structure into the fleece on one side thereof, a structuring metal sheet 0.8 mm in thickness, 1.25×2.50 m in size and having square holes 0.5 cm×0.5 cm in size with struts 0.5 cm in width in-between was inserted between the fleece and the press tool. The desired surface structure was obtained as a result.

For the pressing operation, one-sidedly siliconized release paper was introduced between the fleece and the upper and lower press tools or between the structured metal sheet and the press tool in order that the press tool may be protected from contamination by the curing resin system.

After the impregnated and structured fibrous fleece has cooled down, it is coated with a binder based on a phenol novolak (90 parts by weight) and a curative (hexamethylenetetramine, 10 parts by weight) to an add-on weight of 100 g/m$^2$ by sprinkling. This was followed by thermally fixing the resin system at a surface temperature of 90-95° C. on the impregnated and structured fibrous fleece under an infrared radiator.

c) One ply of the natural-fiber fleece cured in process step b) is laid on the base of a foaming mold equal in size to the building component, for example 2.50×1.25× 0.10 m in size. The mold, which is strengthened by a metal scaffold and has a fixable lid, is lined with wooden walls into which the foamable phenolic resin is filled. Filling can be effected not only using a foam-metering system but also by manually mixing the foam resin components in a suitable vessel and then pouring the mixture into the mold. The foamable phenolic resin used was a system based on an alkali-condensed phenol resol (100 parts by weight) admixed with a blowing agent (pentane, 3 parts by weight) and a curative (phosphoric acid, 20 parts by weight). To achieve a final density of 60 kg/cbm for the foam, about 28.5 kg of foam resin were filled into the mold. The foam resin must be filled into the mold while being speedily and uniformly distributed in the mold in order that a homogeneous foam structure may be obtained later. After the foam resin has been filled into the mold, a ply of the natural-fiber fleece cured in process step b) is laid onto the filled-in foam resin and the mold is closed with the lid, albeit not in an air-tight manner, since the air produced in foaming has to escape sideways.

As mentioned in the context of the present invention, reinforcing elements of various materials and geometries and also recesses and/or installation elements in the form of channels and other shapes can be introduced. To ensure a speedy foaming process, these elements were fixed to the upper ply. The elements were positioned such that the air arising in foaming is free to escape to the side.

Alternatively, the phenolic foam sheet can also be foamed without inserted plies of natural-fiber fleeces cured in process step b). These can be adhered to the phenolic resin foam in a further process step.

After the curing process of the foam, which takes 30 minutes in the case of the phenolic resin foam system mentioned, the structural component can be demolded.

d) After demolding, the structural component was immediately introduced into a temperature chamber and conditioned at a uniform temperature of 65° C. for a period of 14 hours. The structural component was subsequently removed from the temperature chamber, placed on a hydraulic or pneumatic heating press, tool size of which is at least equal to the sheet size, and cured at a temperature of 150-200° C.—preferably 180° C.—by contact with the hot platens for 2-5 minutes, preferably 3 minutes, without employment of pressure. This causes the binder applied in step b) to become activated and thermosettingly cured. On completion of the curing operation, the structural component is removed from the press and cooled down under ambient temperature.

After removal from the conditioning chamber, after curing has taken place, the structural component can be further processed in accordance with its further intended use not only mechanically (sawing, milling, etc) but also in terms of surface coating (painting, varnishing, rendering, etc).

Comparative tests were carried out versus commercially available sandwich panels consisting of GRP outer layers and polyurethane (PU) or polystyrene (EPS) foam cores, which are already used for self-supporting and loadbearing structural components. In these tests, the parameters relating to mechanical strength of existing sandwich elements were exceeded. Both in horizontal compressive loading for floor elements and in vertical compressive loading for wall elements, the commercially available comparative panels exhibited less strength, i.e., earlier failure, than the sandwich construction elements obtained according to the present invention.

The comparison surprisingly showed that the sandwich construction elements obtained according to this invention have far higher stiffness than commercially available sandwich construction elements with PU or EPS foam cores, which is of appreciable advantage for building construction applications in particular, since structural components intended for supporting-framework functions do not require any additional stiffening with wood or steel for example. This stiffness on the part of the element per se was unattainable by previous commercially available sandwich construction elements with PU/EPS core material.

It was further surprisingly found that the phenolic foam core sandwich construction elements obtained according to the present invention have very good long-term characteristics with regard to creep. Since, when the structural components are subjected to a constant mechanical stress, signs of creep appear in the core layer, the structural component may deform without the load increasing. These deformations were 3 times smaller for the structural components obtained as per the present invention than for a comparative element with PU foam core.

More particularly, comparative fire tests revealed a significant improvement in terms of fire resistance, smoke density and smoke toxicity. The expectations that a core material composed of phenolic foam would afford improvement in respect of fire protection requirements were fulfilled.

What is claimed is:

1. A method for producing sandwich construction elements for essentially loadbearing and self-supporting parts of a building, said method comprising the steps of
   a) producing one or more than one ply of a mechanically consolidated fibrous fleece based on naturally occurring raw materials selected from the group consisting of hemp, flax, jute, sisal, kenaf, cotton, wool, and mixtures thereof, each ply impregnated with a binder based on one or more than one heat-curable resin system,
   b) curing the heat-curable resin system to produce one or more than one cured ply of the fibrous fleece, applying a surface structure to at least part of each ply of the fibrous fleece before and/or during curing; and/or applying and thermally fixing one or more than one further binder based on one or more than one heat-curable resin system to at least part of a surface of the cured ply of the fibrous fleece,
   c) contacting a thermally foamable or foamed phenolic resin with the surface, as modified in step b), of one or more than one cured ply of the fibrous fleece,
   d) optionally subjecting the composite produced under a) to c) to conditioning at temperatures in a range from 40 to 80° C., and
   e) if applied, subjecting the further binder based on one or more than one heat-curable resin system and optionally applied in b) to curing in a range from 150 to 200° C., optionally under elevated pressure.

2. The method as claimed in claim 1, wherein the applying the surface structure comprises placing a lattice, grid or structured tool on the ply as it cures.

3. The method as claimed in claim 2, wherein the surface structure comprises angular, round, oval, honeycomb-shaped, dimplelike geometries.

4. The method of claim 1 wherein the binder used in step a) and/or b) is one or more than one heat-curable resin system based on phenolic, epoxy, amino and/or polyester resins.

5. The method of claim 1 wherein the contacting of the foamable phenolic resin with the cured ply in step c) is effected by foaming up the foamable phenolic resin applied to the surface of the cured ply.

6. The method of claim 1 wherein the contacting of foamed phenolic resin with the cured ply in step c) is effected by adhering the foamed phenolic resin to the cured ply.

7. The method-of claim 6, wherein a structure is introduced onto a surface of the foamed phenolic resin by mechanical milling and/or a structured plate.

8. The method of claim 1 wherein reinforcing elements are introduced between the one or more than one cured ply of the fibrous fleece and the foamable or foamed phenolic resin.

9. The method of claim 8 wherein the reinforcing elements are selected from the group consisting of glass fibers, basalt fibers, plastic fibers, carbon fibers, unidirectionals, wovens, fleeces, and combinations thereof.

10. The method of claim 1 wherein reinforcing elements are introduced into the foamable or foamed phenolic resin during foam production.

11. The method of claim 10, wherein the reinforcing elements have geometries selected from the group consisting of stripes, diamonds, cassettes or stars.

12. The method of claim 1 wherein the contacting of a thermally foamable phenolic resin with the surface of one or more than one cured ply further comprises forming recesses, in the one or more than one cured ply prior to the contacting.

* * * * *